US008948152B2

(12) United States Patent
Seok (10) Patent No.: US 8,948,152 B2
(45) Date of Patent: Feb. 3, 2015

(54) METHOD OF PERFORMING LINK ADAPTATION PROCEDURE (71) Applicant: LG Electronics Inc., Seoul (KR)

(72) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/109,646

(22) Filed: Dec. 17, 2013

(65) Prior Publication Data

US 2014/0105200 A1 Apr. 17, 2014

Related U.S. Application Data (63) Continuation of application No. 13/320,722, filed as application No. PCT/KR2009/006776 on Nov. 18, 2009, now Pat. No. 8,634,395.

(60) Provisional application No. 61/219,386, filed on Jun. 23, 2009.

(30) Foreign Application Priority Data

Sep. 3, 2009 (KR) ........................ 10-2009-0082774

(51) Int. Cl.
H04B 7/06 (2006.01)
H04W 84/12 (2009.01)
H04B 7/04 (2006.01)
(Continued)

(52) U.S. Cl.
CPC .............. *H04B 7/063* (2013.01); *H04L 1/0025* (2013.01); *H04W 24/08* (2013.01); *H04B 7/0452* (2013.01); *H04W 84/12* (2013.01); *H04L 1/0003* (2013.01); *H04L 1/0009* (2013.01); *H04W 8/24* (2013.01); *H04W 84/105* (2013.01); *H04W 88/08* (2013.01); *H04L 1/0026* (2013.01);
(Continued)

(58) Field of Classification Search
USPC .................. 370/338, 236, 235, 392, 206, 343
See application file for complete search history.

(56) References Cited

U.S. PATENT DOCUMENTS 7,697,626 B2 4/2010 Wang et al.
8,200,164 B2 6/2012 Trainin et al.
(Continued)

FOREIGN PATENT DOCUMENTS

EP 1 988 653 A1 11/2008
JP 2009-509469 3/2009
(Continued)

*Primary Examiner* — Brian D Nguyen
(74) *Attorney, Agent, or Firm* — Birch, Stewart, Kolasch & Birch, LLP (57) ABSTRACT A method and apparatus for communicating in a wireless local area network are discussed. According to an embodiment, the method includes a method of communicating in a wireless local area network, the method comprising: receiving, by a mobile station, a first physical layer protocol data unit (PPDU) transmitted by an access point (AP) via multi-user multiple input/multiple output (MU MIMO) transmission to a plurality of mobile stations, the first PPDU including a first feedback sequence identifier that includes a specific value identifying the plurality of stations, determining, by the mobile station, that the mobile station belongs to one of the plurality of stations indicated by the first feedback sequence identifier; if it is determined that the mobile station belongs to one of the plurality of stations, estimating a MIMO channel based on the first PPDU; and transmitting, by the mobile station, a second PPDU to the AP.

6 Claims, 8 Drawing Sheets (51) Int. Cl.
  *H04L 1/00*     (2006.01)
  *H04W 24/08*    (2009.01)
  *H04W 8/24*         (2009.01)
  *H04W 84/10*        (2009.01)
  *H04W 88/08*        (2009.01)
  *H04L 25/02*        (2006.01)

(52) U.S. Cl.
  CPC .... *H04L 2001/0093* (2013.01); *H04L 25/0226* (2013.01); *H04B 7/0413* (2013.01)
  USPC .......................................... 370/338; 370/236

(56) References Cited

U.S. PATENT DOCUMENTS

| | | |
|---|---|---|
| 8,374,096 B2 | 2/2013 | Gu et al. |
| 8,780,936 B2* | 7/2014 | Gorokhov .................... 370/468 |
| 2005/0078707 A1* | 4/2005 | Maltsev et al. ............... 370/471 |
| 2006/0248429 A1 | 11/2006 | Grandhi et al. |
| 2006/0291544 A1* | 12/2006 | Fischer et al. ................ 375/219 |
| 2007/0129018 A1* | 6/2007 | Trainin et al. ................... 455/69 |
| 2007/0195811 A1 | 8/2007 | Basson et al. |
| 2007/0201566 A1* | 8/2007 | Solomon et al. ............. 375/260 |
| 2007/0230373 A1 | 10/2007 | Li et al. |
| 2007/0298742 A1 | 12/2007 | Ketchum et al. |
| 2008/0153506 A1 | 6/2008 | Yin et al. |
| 2008/0316981 A1 | 12/2008 | Trainin |
| 2009/0034636 A1* | 2/2009 | Kotecha et al. ............... 375/260 |
| 2009/0034637 A1* | 2/2009 | Hoshino et al. ............... 375/260 |
| 2009/0116589 A1 | 5/2009 | Zhang et al. |
| 2009/0154356 A1 | 6/2009 | Wiemann et al. |
| 2009/0209264 A1* | 8/2009 | Yang et al. .................. 455/452.1 |
| 2009/0247223 A1* | 10/2009 | Yu et al. ........................ 455/557 |
| 2009/0316802 A1 | 12/2009 | Tong et al. |
| 2010/0008406 A1* | 1/2010 | Sawai et al. ................... 375/219 |
| 2010/0008440 A1 | 1/2010 | Lin et al. |
| 2010/0067465 A1 | 3/2010 | Miki et al. |
| 2010/0195614 A1 | 8/2010 | Nimbalker et al. |
| 2010/0238984 A1 | 9/2010 | Sayana et al. |
| 2010/0281333 A1 | 11/2010 | Jöngren et al. |
| 2010/0317355 A1 | 12/2010 | Zangi et al. |
| 2010/0323739 A1 | 12/2010 | Wan et al. |
| 2011/0122971 A1 | 5/2011 | Kim et al. |
| 2013/0155923 A1 | 6/2013 | Yi et al. |

FOREIGN PATENT DOCUMENTS

| | | |
|---|---|---|
| RU | 2 287 220 C2 | 11/2006 |
| WO | WO 2007/041845 A1 | 4/2007 |
| WO | WO 2007/050860 A1 | 5/2007 |
| WO | WO 2007/083569 A1 | 7/2007 |
| WO | WO 2007/126036 A1 | 11/2007 |
| WO | WO 2008/002972 A2 | 1/2008 |
| WO | WO 2008/055179 A2 | 5/2008 |
| WO | WO 2008/084693 A1 | 7/2008 |
| WO | WO 2008/120557 A1 | 10/2008 |
| WO | WO 2009/027931 A2 | 3/2009 |

* cited by examiner

METHOD OF PERFORMING LINK ADAPTATION PROCEDURE

This application is a Continuation of application Ser. No. 13/320,722 (now U.S. Pat. No. 8,634,395) filed Nov. 15, 2011, which is the national phase of PCT International Application No. PCT/KR2009/006776 filed Nov. 18, 2009, which claims priority to U.S. Provisional Application No. 61/219,386 filed Jun. 23, 2009, and which claims priority to Korean Application No. 10-2009-0082774 filed Sep. 3, 2009. The entire contents of all of the above applications are hereby incorporated by reference.

BACKGROUND

1. Field of the Disclosure

The present invention relates to a wireless local area network (WLAN), and more particularly, to a method of allocating a radio resource in a very high throughput (VHT) WLAN system.

2. Description of the Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted.

In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point (AP) protocol compatibility, security enhancement, radio resource measurement, wireless access in vehicular environments, fast roaming, mesh networks, inter-working with external networks, wireless network management, etc.

In the IEEE 802.11, the IEEE 802.11b supports a data rate of up to 11 Mbps by using a frequency band of 2.4 GHz. The IEEE 802.11a commercialized after the IEEE 802.11b uses a frequency band of 5 GHz instead of the frequency band of 2.4 GHz and thus significantly reduces influence of interference in comparison with the very congested frequency band of 2.4 GHz. In addition, the IEEE 802.11a has improved the data rate to up to 54 Mbps by using the OFDM technology. Disadvantageously, however, the IEEE 802.11a has a shorter communication distance than the IEEE 802.11b. Similarly to the IEEE 802.11b, the IEEE 802.11g implements the data rate of up to 54 Mbps by using the frequency band of 2.4 GHz. Due to its backward compatibility, the IEEE 802.11g is drawing attention, and is advantageous over the IEEE 802.11a in terms of the communication distance.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network.

More specifically, the IEEE 802.11n supports a high throughput (HT), i.e., a data processing speed of up to 540 Mbps at a frequency band of 5 GHz, and is based on a multiple input and multiple output (MIMO) technique which uses multiple antennas in both a transmitter and a receiver to minimize a transmission error and to optimize a data rate.

In addition, this standard may use a coding scheme which transmits several duplicated copies to increase data reliability and also may use the OFDM to support a higher data rate.

With the widespread use of the WLAN and the diversification of applications using the WLAN, there is a recent demand for a new WLAN system to support a higher throughput than a data processing speed supported by the IEEE 802.11n. A very high throughput (VHT) WLAN system is one of IEEE 802.11 WLAN systems which have recently been proposed to support a data processing speed of 1 Gbps or more. The VHT WLAN system is named arbitrarily. To provide a throughput of 1 Gbps or more, a feasibility test is currently being conducted for the VHT system which uses 4? MIMO and a channel bandwidth of 80 MHz or more and which also uses a spatial division multiple access (SDMA) scheme as a channel access scheme.

The conventional channel access mechanism used in the IEEE 802.11n WLAN system or other WLAN systems cannot be directly used as a channel access mechanism of a WLAN system for providing a throughput of 1 Gbps or more (hereinafter, such a WLAN system is referred to as a VHT WLAN system). This is because a channel bandwidth used by the VHT WLAN system is at least 80 MHz since the conventional WLAN system operates under the premise of using a channel bandwidth of 20 MHz or 40 MHz which is too narrow to achieve the throughput of 1 Gbps or more in a service access point (SAP).

Therefore, in order for a VHT basic service set (BSS) to satisfy a total throughput of 1 Gbps or more, several VHT STAs need to simultaneously use a channel in an effective manner. A VHT AP uses SDMA to allow the several VHT STAs to simultaneously use the channel in an effective manner. That is, the several VHT STAB are allowed to simultaneously transmit and receive data to and from the VHT AP.

A modulation and coding scheme (MCS) feedback method is one of methods for more effectively supporting link adaptation in such an IEEE 802.11n MIMO environment. A link adaptation procedure uses a specific MCS with given link quality to increase a data throughput by using a highest transfer rate. However, since the conventional MCS feedback method is achieved under the premise that one-to-one communication is achieved between a station and an AP, the conventional method needs to be compensated when it applies to a multi-user MIMO environment.

SUMMARY OF THE INVENTION

In a link adaptation protocol, a modulation and coding scheme (MCS) feedback procedure is limited to be used only for a point-to-point transmission scenario. Therefore, there is a problem in that an environment such as a multi-user multiple input multiple output (MIMO) environment cannot sufficiently consider other factors which may occur in point-to-multi point transmission.

A link adaptation scheme suitable for the multi-user environment is provided according to embodiments of the present invention. Influence caused by other users can be taken into consideration when several users simultaneously perform data transmission or reception. In this case, an actual communication environment can be taken into consideration to perform link adaptation with more accurate information.

In an aspect of the present invention, a method of performing a link adaptation procedure for multi-user transmission in a wireless local area network (WLAN) system includes receiving a modulation and coding scheme (MCS) feedback request transmitted by an access point (AP) to a plurality of stations, estimating an MCS by considering a spatial stream corresponding to the MCS feedback request transmitted to the other stations, and transmitting an MCS feedback response comprising the estimated MCS to the AP.

The MCS feedback request may be transmitted by being included in a sounding physical layer convergence procedure (PLCP) protocol data unit (PPDU) steered in accordance with a pre-coding vector corresponding to each station receiving the MCS feedback request.

The MCS feedback request may comprise an MCS feedback order for designating an order of each MCS feedback response corresponding to the MCS feedback request, and the MCS feedback response may be transmitted at a time point depending on the MCS feedback order.

The MCS feedback request may be received together with a null data packet (NDP) announcement, and the method may further comprise receiving an NDP frame from the AP immediately after receiving the NDP announcement and the MCS feedback request.

The MCS may be estimated by using the NDP frame.

Influence caused by other users can be taken into consideration when several users simultaneously perform data transmission or reception. Further, an actual communication environment can be taken into consideration to perform link adaptation with more accurate information.

DETAILED DESCRIPTION OF THE EMBODIMENTS

Figure 1:
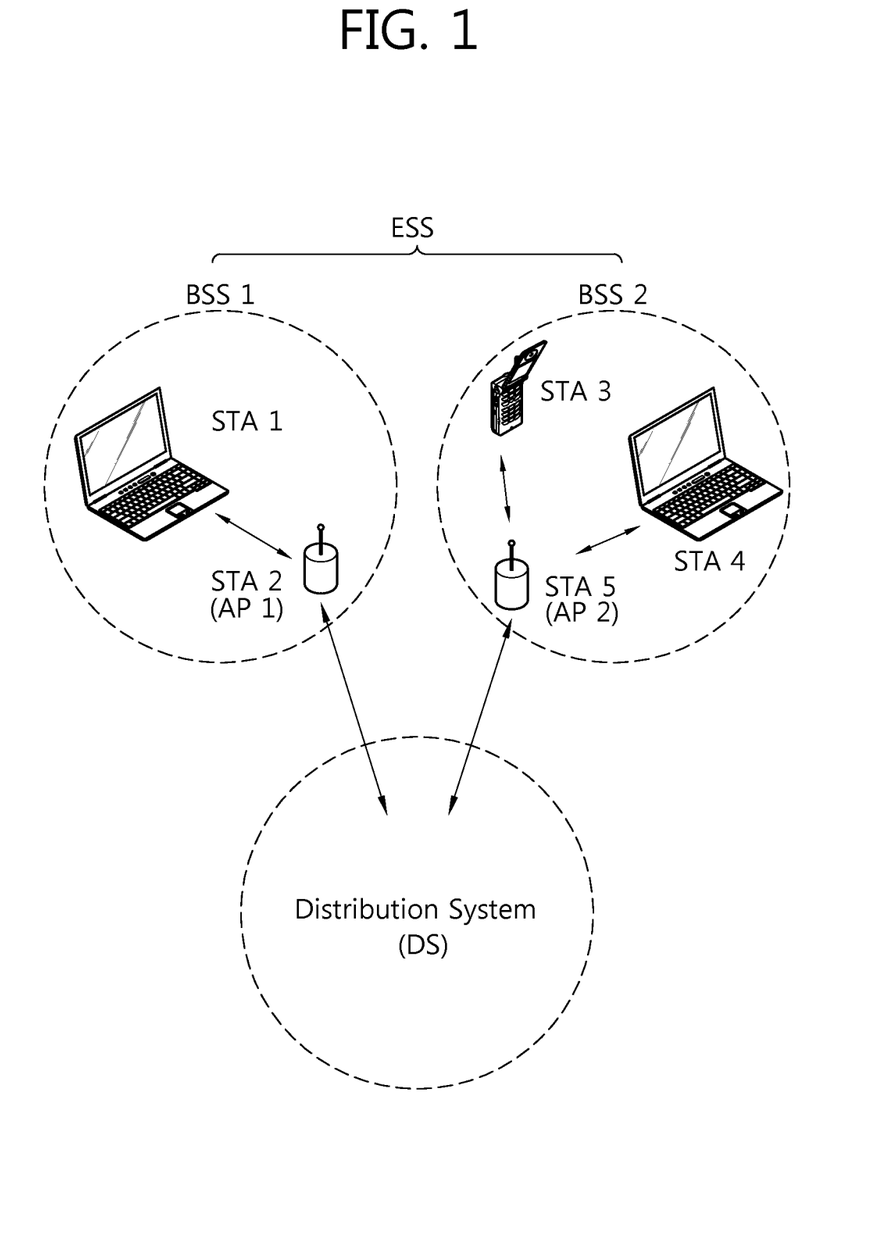
FIG. 1 is a schematic view showing an exemplary structure of a very high throughput (VHT) wireless local area network (WLAN) system according to an embodiment of the present invention.

FIG. 1 is a schematic view showing an exemplary structure of a very high throughput (VHT) wireless local area network (WLAN) system according to an embodiment of the present invention.

Referring to FIG. 1, a WLAN system such as the VHT WLAN system includes one or more basis service sets (BSSs). The BSS is a set of stations (STAs) which are successfully synchronized to communicate with one another, and is not a concept indicating a specific region. As in the WLAN system to which the embodiment of the present invention is applicable, a BSS that supports a super high-speed data processing of 1 GHz or more is referred to as a VHT BSS.

The VHT BSS can be classified into an infrastructure BSS and an independent BSS (IBSS). The infrastructure BSS is shown in FIG. 1.

Infrastructure BSSs (i.e., BSS1 and BSS2) include one or more non-access point (AP) STAs (i.e., Non-AP STA1, Non-AP STA3, and Non-AP STA4), AP STAs (i.e., AP STA1 and AP STA2) which are STAs providing a distribution service, and a distribution system (DS) connecting the plurality of AP STAs (i.e., AP STA1 and AP STA2). In the infrastructure BSS, an AP STA manages non-AP STAs of the BSS.

On the other hand, the IBSS is a BSS operating in an ad-hoc mode. Since the IBSS does not include the VHT STA, a centralized management entity for performing a management function in a centralized manner does not exist. That is, the IBSS manages the non-AP STAs in a distributed manner. In addition, in the IBSS, all STAs may consist of mobile STAs, and a self-contained network is configured since connection to the DS is not allowed.

The STA is an arbitrary functional medium including a medium access control (MAC) and wireless-medium physical layer (PHY) interface conforming to the institute of electrical and electronics engineers (IEEE) 802.11 standard, and includes both an AP and a non-AP STA in a broad sense. A VHT STA is defined as an STA that supports the super high-speed data processing of 1 GHz or more in the multi-channel environment to be described below. In the VHT WLAN system to which the embodiment of the present invention is applicable, STAs included in the BSS may be all VHT STAs, or a VHT STA and a legacy STA (i.e., IEEE 802.11n-based HT STA) may coexist.

The STA for wireless communication includes a processor and a transceiver, and also includes a user interface, a display means, etc. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

Among the STAs, non-AP STAs (i.e., STA1, STA3, STA4, and STA5) are portable terminals operated by users. A non-AP STA may be simply referred to as an STA. The non-AP STA may also be referred to as a terminal, a wireless transmit/receive unit (WTRU), a user equipment (UE), a mobile station (MS), a mobile terminal, a mobile subscriber unit, etc. A non-AP VHT-STA (or simply VHT STA) is defined as a non-AP STA that supports the super high-speed data processing of 1 GHz or more in the multi-channel environment to be described below.

The AP (i.e., AP1 and AP2) is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT AP is defined as an AP that supports the super high-speed data processing of 1 GHz or more in the multi-channel environment to be described below.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical construction for interconnecting APs.

Figure 2:
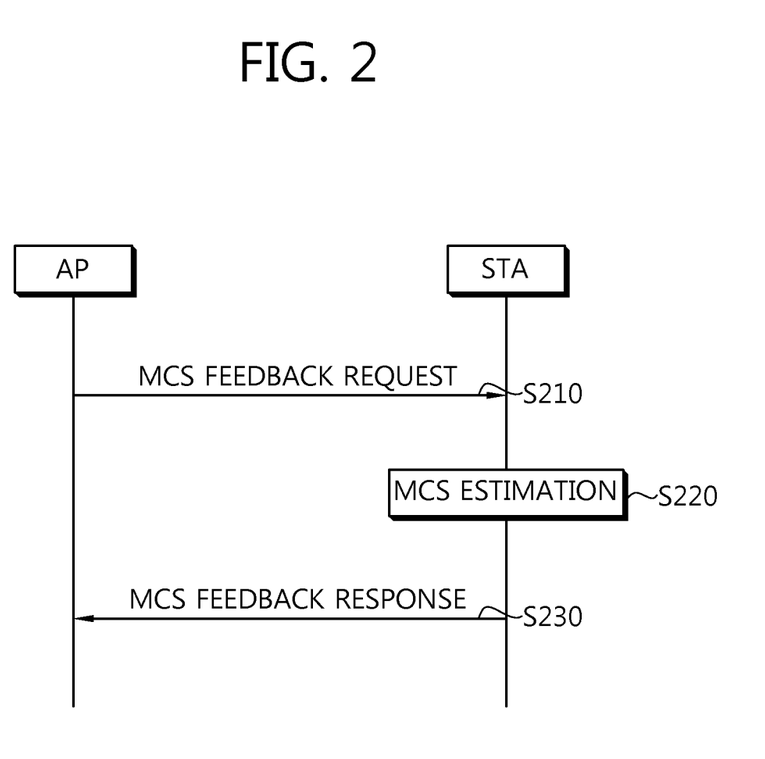
FIG. 2 is a flowchart showing an example of a link adaptation scheme according to the prior art.

FIG. 2 is a flowchart showing an example of a link adaptation scheme according to the prior art. The link adaptation scheme of FIG. 2 is for single-user MIMO.

The link adaptation scheme is performed by exchanging modulation and coding scheme (MCS) information between an MCS feedback requester and its counterpart terminal. Herein, an AP corresponds to the MCS feedback requester, and an MCS feedback responder is a user terminal, which is referred in the present invention as a station (STA).

To receive an MCS feedback from the STA, the AP transmits an MCS feedback request (MRQ) to the STA (step S210). The MRQ can be transmitted using a link adaptation control subfield of a high throughput control (HTC) field conforming to the IEEE 802.11n standard. In addition, in order to allow an STA receiving the MRQ to perform MCS calculation, the AP can transmit the MRQ by using a sounding physical layer convergence procedure (PLCP) protocol data unit (PPDU).

The STA estimates an MCS value (step S220). Further, in response to the MRQ, an MCS feedback response is transmitted, and the estimated MCS value is transmitted to the AP (step S230). The estimated MCS value can also be transmitted to the AP by using the link adaptation control subfield of the HTC field.

Figure 3:
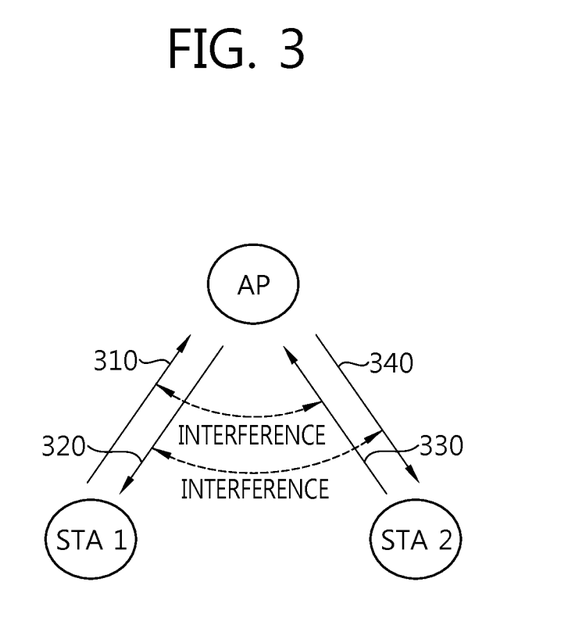
FIG. 3 shows a problem of a link adaptation scheme according to the prior art.

FIG. 3 shows a problem of a link adaptation scheme according to the prior art.

An AP performs downlink transmission simultaneously to several STAs in multi-user MIMO. Alternatively, a plurality of STAs perform uplink transmission to the AP.

Referring to FIG. 3, an STA 1 and an STA 2 can perform uplink transmission and downlink transmission, and the two STAs can simultaneously perform uplink transmission or downlink transmission. It is assumed that the AP has two or more antennas, and each STA has one antenna.

If the STA 1 and the STA 2 simultaneously perform uplink transmission (steps 310 and 330), uplink transmission (step 310) of the STA 1 may act as interference to uplink transmission (step 330) of the STA 2, and likewise, uplink transmission (step 330) of the STA 2 may act as interference to uplink transmission (step 310) of the STA 1.

The same also apply to a downlink scenario. That is, when the AP performs downlink transmission simultaneously to the STA 1 and the STA 2 (steps 320 and 340), downlink transmission (step 320) to the STA 1 may act as interference to downlink transmission (step 340) of the STA 2, and likewise, downlink transmission (step 340) to the STA 2 may act as interference to downlink transmission (step 320) of the STA 1.

Therefore, for a link adaptation protocol in multi-user MIMO, interference generated by a spatial stream to be transmitted to another STA needs to be taken into consideration when performing MCS estimation.

That is, when the AP performs downlink transmission simultaneously to the STAs, each STA is interfered by a spatial stream to be transmitted toward another STA. Even if the AP performs simultaneous transmission by selecting STAs having a low channel correlation, constraint or cancellation of interference cannot be guaranteed.

Figure 4:
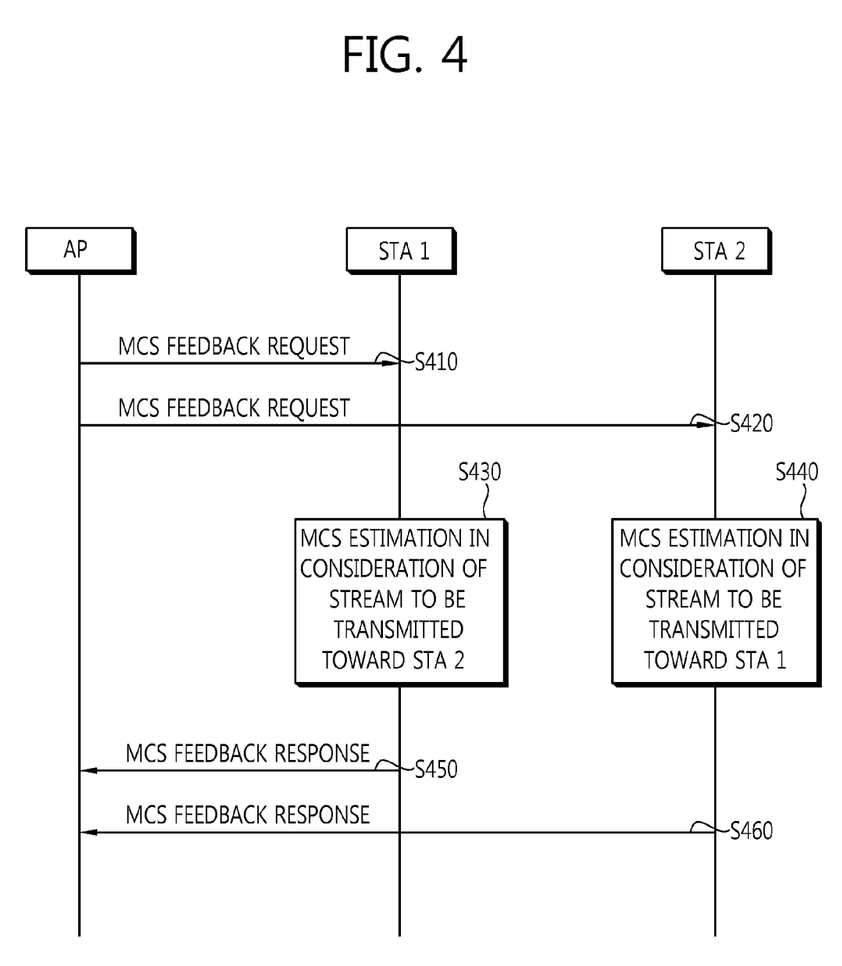
FIG. 4 is a flowchart showing an example of a method of performing a link adaptation procedure according to an embodiment of the present invention.

FIG. 4 is a flowchart showing an example of a method of performing a link adaptation procedure according to an embodiment of the present invention.

A link adaptation protocol in multi-user MIMO is proposed in the embodiment of the present invention. Although a downlink transmission scenario is described in this embodiment described with reference to FIG. 4, a link adaptation protocol according to the embodiment of the present invention may also equally apply to uplink transmission.

For example, when downlink transmission is performed simultaneously to a plurality of STAs, interference between STAs can be minimized in such a manner that an AP transmits streams by selecting and grouping STAs having a low channel correlation if downlink transmissions are simultaneously performed, thereby facilitating interference reduction. However, as described above, an MCS value estimated in single-user MIMO is problematic in a sense that interference generated by a spatial stream to be transmitted toward other terminals cannot be properly considered in a multi-user MIMO environment. In addition, when using only a method of transmitting data by classifying the STAs according to a channel correlation, interference cannot be effectively reduced or considered in the link adaptation procedure, and an MCS cannot be accurately recognized.

In order to allow accurate MCS estimation when an STA estimates an MCS and feeds back the MCS to an AP, the AP can transmit an MCS feedback request (MRQ) simultaneously to STAs for performing downlink transmission by using a sounding PPDU. More specifically, the AP transmits the MRQ to an STA 1 and an STA 2 by using a sounding PPDU (steps S410 and S420). In doing so, the respective STAs can more effectively estimate an MCS at that moment on a real time basis by considering an interference level caused by spatial streams to be transmitted toward other STAs.

In FIG. 4, an example of downlink multi-user MIMO is shown. A link adaptation scheme of the present invention can also equally apply to uplink multi-user MIMO.

The STAs (i.e., STA 1 and STA 2) receiving the MRQ from the AP estimate an MCS by considering mutual interference. That is, the STA 1 estimates an MCS value of the STA 1 by considering a spatial stream transmitted to the STA 2, and the STA 2 estimates an MCS value of the STA 2 by considering a spatial stream transmitted to the STA 1.

Further, the STA 1 and the STA 2 transmit an MCS feedback response to the AP, and the MCS feedback response includes information on the MCS values estimated respectively by the STA 1 and the STA 2 (steps S450 and S460). By using the MCS values estimated by this process in consideration of a communication environment such as currently generated interference, a link throughput can be more increased by performing a link adaptation scheme suitable for a multi-user environment.

Figure 5:
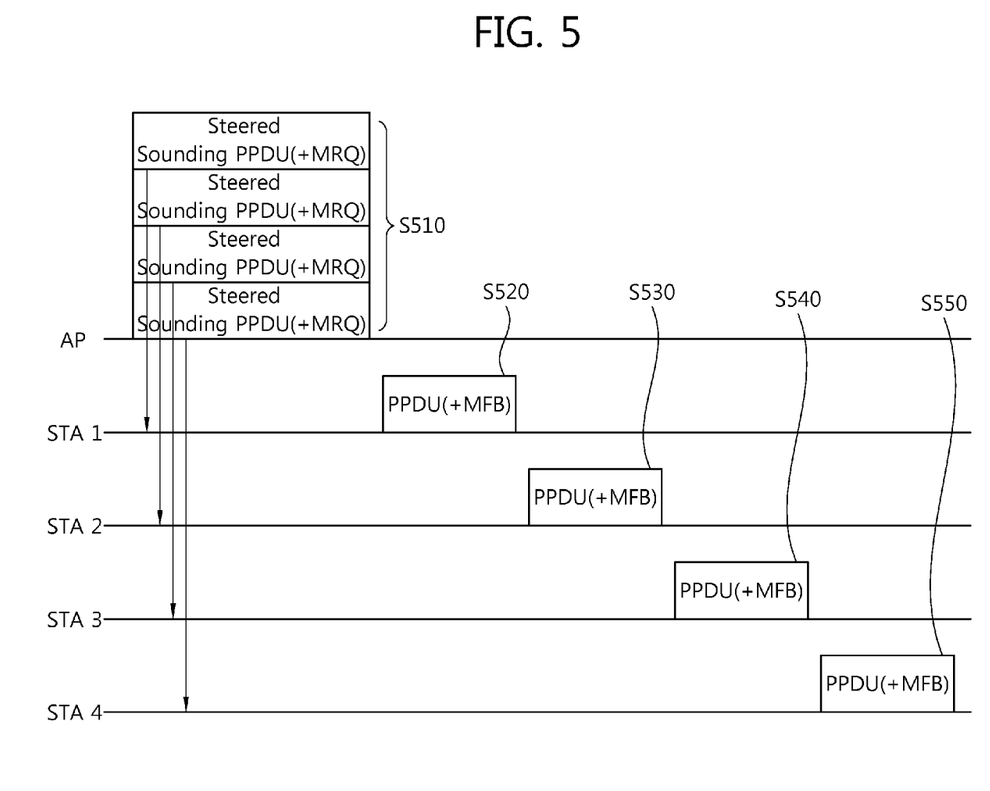
FIG. 5 shows a link adaptation procedure according to another embodiment of the present invention.

FIG. 5 shows a link adaptation procedure according to another embodiment of the present invention. Similarly to FIG. 4, uplink transmission is achieved in the embodiment of FIG. 5. However, it is obvious that a link adaptation method according the embodiment of the present invention can also equally apply to uplink transmission.

The embodiment of FIG. 5 is similar to an actual wireless communication environment in a sense that STAs of a more number of users participate in transmission, and in particular, is different from the embodiment of FIG. 4 in a sense that an order is assigned to an MCS feedback.

In this case, an AP is an MCS feedback requester. STAs (i.e., STA 1, STA 2, STA 3, and STA 4) feedback an MCS to the AP, and the AP intends to perform downlink multi-user transmission to the STA 1, the STA 2, the STA 3, and the STA 4.

The AP transmits an MCS feedback request (MRQ) simultaneously to the STA 1, the STA 2, the STA 3, and the STA 4 (step S510). In this case, the MRQ is transmitted using a sounding PPDU, and is transmitted by being steered in accordance with a pre-coding vector configured for each receiving terminal.

Each of the STAs (i.e., STA 1, STA 2, STA 3, and STA 4) estimates an MCS by using the received sounding PPDU. In particular, since the AP has transmitted the sounding PPDU simultaneously to the STA 1, the STA 2, the STA 3, and the STA 4, each STA can performs MCS estimation by considering interference generated by a spatial stream corresponding to the sounding PPDU transmitted to another STA.

An MCS feedback sequence identifier may be included in the MRQ transmitted by the AP to the STAs. However, when the AP transmits the MRQ simultaneously to the respective STAs, the MCS feedback sequence identifier is set to the same value. This implies that an MCS feedback to be responded by the STAs corresponds to the same MCS feedback request.

In this case, the MCS feedback requester sets the same MCS feedback sequence identifier to STAs for performing multi-user transmission so as to effectively manage MCS feedback reports and so as to decrease waste of identifier space for the MCS feedback sequence identifier. The MCS feedback sequence identifier may be included in a link adaptation control subfield.

If the MRQ has the same MCS feedback sequence identifier, an MCS feedback sequence identifier of an MCS feedback transmitted by each STA also has the same value. Therefore, when an AP (i.e., an MCS feedback requester) receives a plurality of MCS feedbacks having the same MCS feedback sequence identifier, it can be seen that these values are MCS values estimated by the respective STAs corresponding to multi-user transmissions simultaneously performed.

The MRQ may include an MCS feedback order. The MRQ can assign transmission orders of MCS feedbacks transmitted by a plurality of STAs (i.e., STA 1, STA 2, STA 3, and STA 4) to an AP. Therefore, the STA 1, the STA 2, the STA 3, and the STA 4 transmit MCS feedback responses sequentially according to the MCS feedback orders included in the received MRQs (step S520, S530, S540, and S550). In the embodiment described with reference to FIG. 5, it is assumed that the MCS feedback orders are set such that the MCS feedback responses are transmitted according to the orders of the STA 1, the STA 2, the STA 3, and the STA 4. By setting the MCS feedback orders, the MCS feedbacks can be prevented from collision.

In a case where the AP transmits the MRQ while intending to receive an MCS feedback response for that request at a specific time later, the AP may set a delayed time and broadcast the MRQ after the delayed time by using a frame different from that used for sounding PPDU transmission. In this case, the MRQ may include information regarding an order according to which a corresponding MCS feedback is transmitted.

In addition, the MCS feedback sequence identifier and the MCS feedback order included in the MRQ may also equally apply to other embodiments of the present invention.

Figure 6:
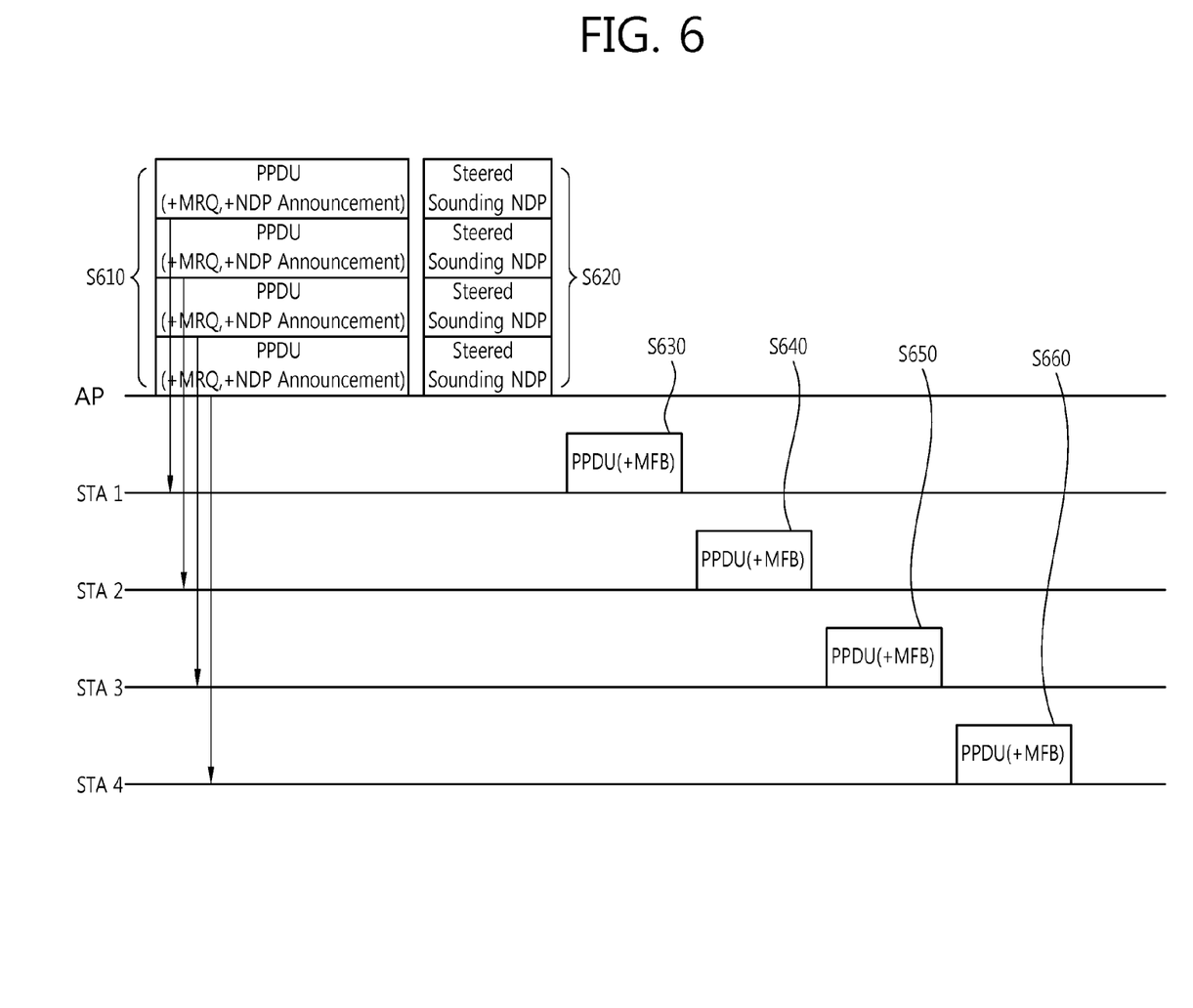
FIG. 6 shows a link adaptation procedure according to another embodiment of the present invention.

FIG. 6 shows a link adaptation procedure according to another embodiment of the present invention.

A link adaptation protocol shown in FIG. 6 uses a null data packet (NDP) in multi-user MIMO.

Among MAC data types conforming to the IEEE 802.11 standard, a null data frame implies that only a MAC header exists whereas a MAC service data unit (MSDU) does not exist. On the other hand, the NDP implies that only a PHY header exists whereas a physical layer convergence procedure (PLCP) service data unit (PSDU) does not exist as well as actual data.

Since the NDP does not have a MAC header, there is no field indicating a source address, a destination address, etc. Therefore, to transmit the NDP, a non-NDP PPDU must be transmitted prior to transmission of the NDP. The NDP is transmitted immediately after the non-NDP PPDU is transmitted. The non-NDP PPDU implies a normal PPDU other than the NDP. An NDP announcement must be set in the NDP PPDU so as to announce to a receiving side that the NDP will be transmitted soon.

In the 802.11n standard, the NDP is announced by setting a bit corresponding to an NDP announcement of an HTC field to 1. A source address and a destination address of a non-NDP PPDU that is an NDP announcement frame are a source address and a destination address of an NDP. The NDP is a sounding PPDU, and the receiving side that receives the NDP performs channel estimation by using the NDP.

Also in this case, an AP is an MCS feedback requester and intends to perform downlink multi-user transmission to an STA 1, an STA 2, an STA 3, and an STA 4. As described above, the link adaptation procedure according to the embodiment of the present invention can also apply not only to downlink transmission but also to uplink transmission.

The AP transmits an MCS feedback request (MRQ) simultaneously to the STA 1, the STA 2, the STA 3, and the STA 4, and sets an NDP announcement in a PPDU including the MRQ (step S610). Subsequent to transmission of the MRQ, NDP frames are respectively transmitted to the STA 1, the STA 2, the STA 3, and the STA 4 (step S620). In this case, the NDP frames are transmitted by being steered in accordance with a pre-coding vector configured for each STA.

The STA 1, the STA 2, the STA 3, and the STA 4 may estimate an MCS by using the received NDP frames, and may transmit an MCS feedback response to the AP in response to the previously received MRQ (steps S630, S640, S650, and S660). Of course, the MCS feedback response includes an estimated MCS value. In addition, since the AP transmits an NDP frame simultaneously to the STA 1, the STA 2, the STA 3, and the STA 4, each STA can perform MCS estimation by considering interference caused by a spatial stream corresponding to the NDP frame to be transmitted to another STA.

Figure 7:
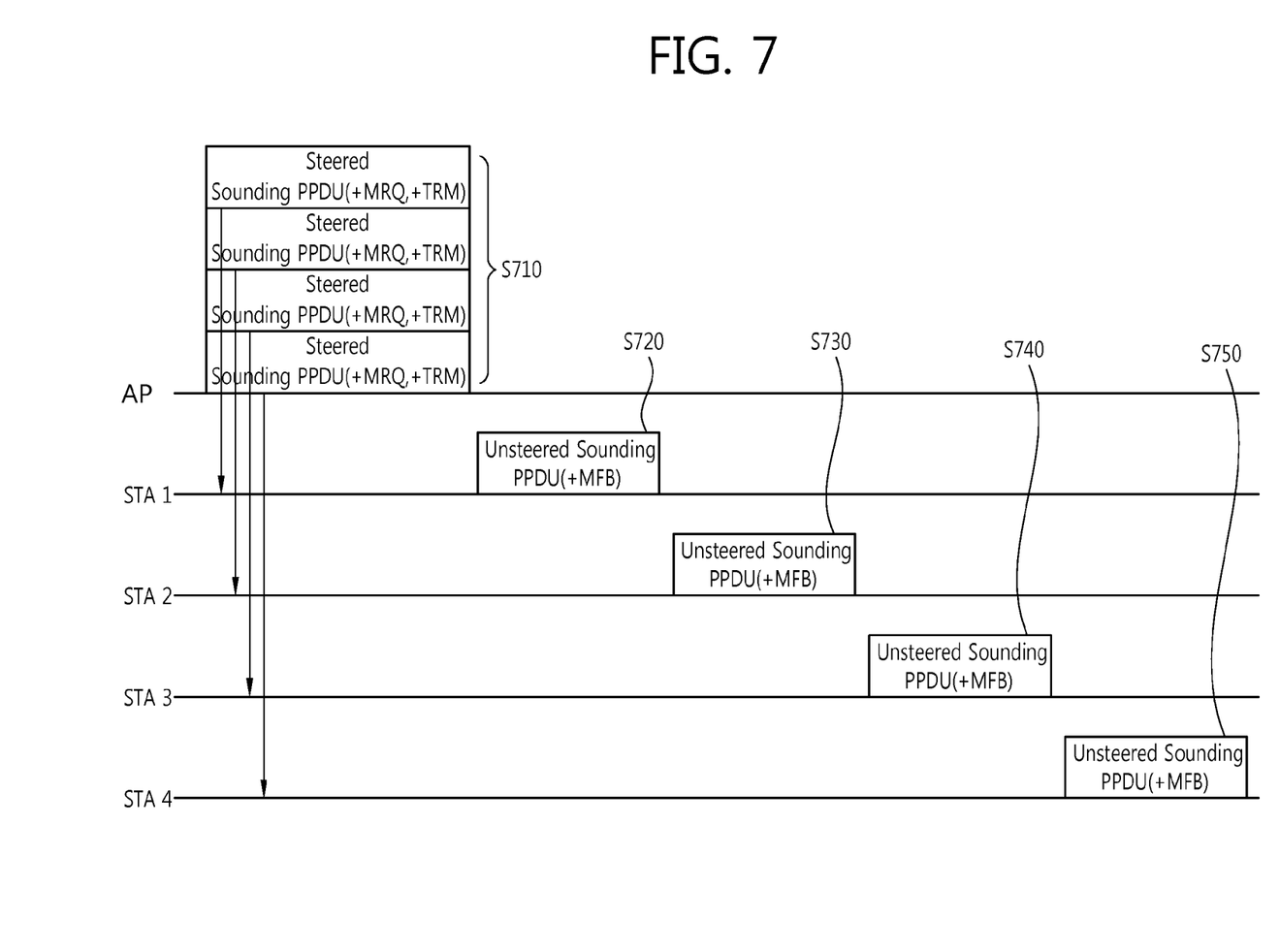
FIG. 7 shows a link adaptation procedure according to another embodiment of the present invention.

FIG. 7 shows a link adaptation procedure according to another embodiment of the present invention.

According to the embodiment of FIG. 7, a link training procedure and a link adaptation procedure are simultaneously performed.

In case of the link training, an AP transmits a training request message (TRM) to STAs (i.e., STA 1, STA 2, STA 3, and STA 4) (step S710). The TRM is transmitted simultaneously to the respective STAs by being included in a sounding PPDU steered in accordance with a pre-coding vector configured for each STA. An MCS feedback request (MRQ) is included also in the sounding PPDU transmitted by the AP to the STAs.

Upon receiving the TRM and the steered sounding PPDU including the MRQ, the STAs (i.e., STA 1, STA 2, STA 3, and STA 4) transmits an unsteered sounding PPDU to an AP STA so that the AP can perform channel estimation (steps S720, S730, S740, and S750). It is assumed herein that an uplink channel and a downlink channel have mutually reversible characteristics. Therefore, the present embodiment can also apply to both uplink transmission and downlink transmission.

That is, when the link training and the link adaptation are performed simultaneously, the AP transmits the TRM by using the sounding PPDU, and at the same time, transmits the MRQ. In this case, the sounding PPDU is a steered PPDU to be transmitted toward each STA. Further, upon receiving the sounding PPDU transmitted from the AP, the STAs estimate an MCS by further considering spatial steams corresponding to sounding PPDUs transmitted from other STAs, and thereafter respond to the AP by transmitting an MCS feedback.

In this case, for the link training requested by the AP by using the TRM, the STAs (i.e., STA 1, STA 2, STA 3, and STA 4) transmit MCS feedbacks also by using the sounding PPDU. The sounding PPDU transmitted by the STA 1, the STA 2, the STA 3, and the STA 4 is for channel estimation of the AP, and is transmitted in a state of an unsteered PPDU.

The AP performs channel estimation by using the sounding PPDU transmitted by the STA 1, the STA 2, the STA 3, and the STA 4. If there is a change in a channel state between the AP and any one of the STA 1, the STA 2, the STA 3, and the STA 4, the AP uses the changed channel state to correct an MCS value responded by a corresponding STA. Otherwise, if there is no change in the channel state between the AP and any one of the STA 1, the STA 2, the STA 3, and the STA 4, the AP uses the MCS value responded by the STA 1, the STA 2, the STA 3, and the STA 4 to perform uplink or downlink multi-user transmission.

Figure 8:
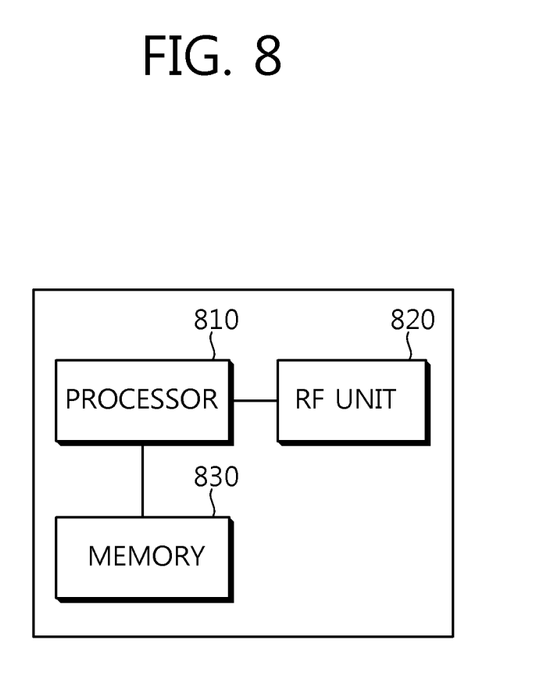
FIG. 8 is a block diagram of a wireless communication apparatus for performing a link adaptation procedure according to an embodiment of the present invention.

FIG. 8 is a block diagram of a wireless communication apparatus for performing a link adaptation procedure according to an embodiment of the present invention. The aforementioned STAs may be an example of the wireless communication apparatus of FIG. 8.

The wireless communication apparatus includes a processor 810 and a radio frequency (RF) unit 820. A memory 830 is coupled to the processor 810 and stores a variety of information to drive the processor 810. The memory 830 may include a read-only memory (ROM), a random access memory (RAM), a flash memory, a memory card, a storage medium, and/or other equivalent storage devices. In addition thereto, the wireless communication apparatus may further include a display unit or a user interface. Since this is apparent to those ordinary skilled in the art, the display unit or the user interface is not depicted in FIG. 8, and detailed descriptions thereof will be omitted.

The wireless communication apparatus described with reference to FIG. 8 can perform the link adaptation procedure or the method of performing the link adaptation procedure according to the embodiments of the present invention described above with reference to FIG. 1 to FIG. 7.

The processor 810 may include an application-specific integrated circuit (ASIC), a separate chipset, a logic circuit, and/or a data processing unit. The processor 810 generates a control signal or data to be transmitted to another STA or AP. The processor 810 estimates an MCS value upon receiving an MCS feedback request from an AP via the RF unit 820.

The processor 810 also considers interference caused by a spatial stream corresponding to an MCS feedback request transmitted to another terminal in the process of MCS estimation. Therefore, the MCS can be more accurately estimated by considering a communication environment on a real time basis. Further, the processor 810 generates an MCS feedback response including the estimated MCS.

The RF unit 820 is coupled to the processor 810. The RF unit 820 transmits a radio signal generated by the processor 810, and receives a radio signal transmitted by another wireless communication apparatus. The RF unit 820 may include a baseband circuit for processing the radio signal. Signals can be transmitted in a broadcast or unicast manner. According to the embodiment of the present invention, the RF unit 820 can receive an MCS feedback request and/or a training request message from the AP, and can transmit an MCS feedback response generated by the processor 810 to the AP.

All functions described above may be performed by a processor such as a microprocessor, a controller, a microcontroller, an application specific integrated circuit (ASIC), or a processor of a terminal (e.g., the wireless communication apparatus illustrated in FIG. 8) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of communicating in a wireless local area network, the method comprising:

receiving, by a mobile station, a first physical layer protocol data unit (PPDU) transmitted by an access point (AP) via multi-user multiple input/multiple output (MU MIMO) transmission to a plurality of mobile stations, the first PPDU including a first feedback sequence identifier that includes a specific value identifying the plurality of stations, determining, by the mobile station, that the mobile station belongs to one of the plurality of stations indicated by the first feedback sequence identifier;

if it is determined that the mobile station belongs to one of the plurality of stations, estimating a MIMO channel based on the first PPDU; and transmitting, by the mobile station, a second PPDU to the AP, wherein the second PPDU includes channel information of the MIMO channel and a second feedback sequence identifier, the second feedback sequence identifier including the specific value indicated by the first feedback sequence identifier.

2. The method of claim 1, wherein the first PPDU further includes a modulation and coding scheme (MCS) feedback request transmitted by the AP to the plurality of mobile stations.

3. The method of claim 1, wherein the first PPDU includes a feedback order that indicates a first mobile station of the plurality of mobile stations to send a response for the first PPDU.

4. A wireless apparatus of communicating in a wireless local area network, the wireless apparatus comprising:

a processor;

a memory operatively coupled with the processor and storing instructions that when executed by the processors causes to the wireless apparatus to:

receive a first physical layer protocol data unit (PPDU) transmitted by an access point (AP) via multi-user multiple input/multiple output (MU MIMO) transmission to a plurality of mobile stations, the first PPDU including a first feedback sequence identifier that includes a specific value identifying the plurality of stations, determine that the wireless apparatus belongs to one of the plurality of stations indicated by the first feedback sequence identifier;

if it is determined that the wireless apparatus belongs to one of the plurality of stations, estimating a MIMO channel based on the first PPDU; and transmitting a second PPDU to the AP, wherein the second PPDU includes channel information of the MIMO channel and a second feedback sequence identifier, the second feedback sequence identifier including the specific value indicated by the first feedback sequence identifier.

5. The wireless apparatus of claim 4, wherein the first PPDU further includes a modulation and coding scheme (MCS) feedback request transmitted by the AP to the plurality of mobile stations.

6. The wireless apparatus of claim 4, wherein the first PPDU includes a feedback order that indicates a first mobile station of the plurality of mobile stations to send a response for the first PPDU.

\* \* \* \* \*